United States Patent
Jairazbhoy et al.

(10) Patent No.: US 9,452,683 B2
(45) Date of Patent: Sep. 27, 2016

(54) TRACTION BATTERY THERMAL PLATE WITH LONGITUDINAL CHANNEL CONFIGURATION

(71) Applicant: Ford Global Technologies, LLC, Dearborn, MI (US)

(72) Inventors: Vivek Amir Jairazbhoy, Farmington Hills, MI (US); George Albert Garfinkel, Westland, MI (US); Neil Robert Burrows, White Lake Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 14/189,161

(22) Filed: Feb. 25, 2014

(65) Prior Publication Data

US 2015/0244037 A1    Aug. 27, 2015

(51) Int. Cl.

| H01M 10/6552 | (2014.01) |
|---|---|
| B60L 11/18 | (2006.01) |
| H01M 10/625 | (2014.01) |
| H01M 10/647 | (2014.01) |
| H01M 10/6556 | (2014.01) |

(52) U.S. Cl.
CPC ........... B60L 11/18 (2013.01); H01M 10/625 (2015.04); H01M 10/647 (2015.04); H01M 10/6556 (2015.04); Y02T 10/7005 (2013.01)

(58) Field of Classification Search
None
See application file for complete search history.

(56) References Cited

U.S. PATENT DOCUMENTS

| 4,322,776 | A | 3/1982 | Job et al. | |
|---|---|---|---|---|
| 8,268,472 | B2 | 9/2012 | Ronning et al. | |
| 8,297,686 | B2 | 10/2012 | Redmond | |
| 2004/0126629 | A1 | 7/2004 | Reiser | |
| 2006/0291165 | A1* | 12/2006 | Flesch | ................... H01L 23/473 361/699 |
| 2007/0141453 | A1 | 6/2007 | Mahalingam et al. | |
| 2009/0258289 | A1 | 10/2009 | Weber et al. | |
| 2010/0151300 | A1 | 6/2010 | Gutsch et al. | |
| 2010/0282452 | A1* | 11/2010 | Diem | .................... F01K 23/065 165/167 |
| 2010/0307723 | A1 | 12/2010 | Thomas et al. | |
| 2011/0027640 | A1 | 2/2011 | Gadawski et al. | |
| 2011/0200862 | A1 | 8/2011 | Kurosawa | |
| 2011/0206967 | A1 | 8/2011 | Itsuki | |
| 2011/0212355 | A1 | 9/2011 | Essinger et al. | |
| 2011/0281145 | A1 | 11/2011 | TenHouten | |
| 2012/0009455 | A1 | 1/2012 | Yoon | |
| 2012/0045681 | A1 | 2/2012 | Klaus et al. | |
| 2012/0148889 | A1* | 6/2012 | Fuhr | ................... H01M 2/1077 429/87 |

(Continued)

FOREIGN PATENT DOCUMENTS

JP    2010157502 A    7/2010

*Primary Examiner* — Lucas J O'Donnell
(74) *Attorney, Agent, or Firm* — David B. Kelly; Brooks Kushman P.C.

(57) ABSTRACT

A traction battery assembly for a vehicle is provided. The traction battery assembly may include a battery cell array and a thermal plate configured to support the battery cell array. The thermal plate may define an inlet port, two outer channels each having a channel inlet in communication with the inlet port, at least three inner channels disposed between the outer channels, and an outlet port. The ports and channels may be arranged such that fluid traveling through any two adjacent channels flows in opposite directions and fluid, when exiting the thermal plate, empties from one or more of the inner channels into the outlet port without first entering the channel inlets.

19 Claims, 5 Drawing Sheets

(56) References Cited

U.S. PATENT DOCUMENTS

| | | |
|---|---|---|
| 2012/0244397 A1 | 9/2012 | TenHouten et al. |
| 2012/0308868 A1 | 12/2012 | Kruger et al. |
| 2013/0108897 A1 | 5/2013 | Christian et al. |
| 2013/0143093 A1* | 6/2013 | Teng .................... F28F 3/12 429/120 |
| 2014/0356652 A1 | 12/2014 | Boddakayala et al. |
| 2015/0244038 A1* | 8/2015 | Jairazbhoy .......... H01M 10/613 429/120 |
| 2015/0244039 A1* | 8/2015 | Jairazbhoy ........ H01M 10/5016 429/120 |
| 2015/0244044 A1* | 8/2015 | Boddakayala ...... H01M 10/613 429/120 |
| 2015/0263397 A1* | 9/2015 | Janarthanam ..... H01M 10/5053 429/120 |

\* cited by examiner

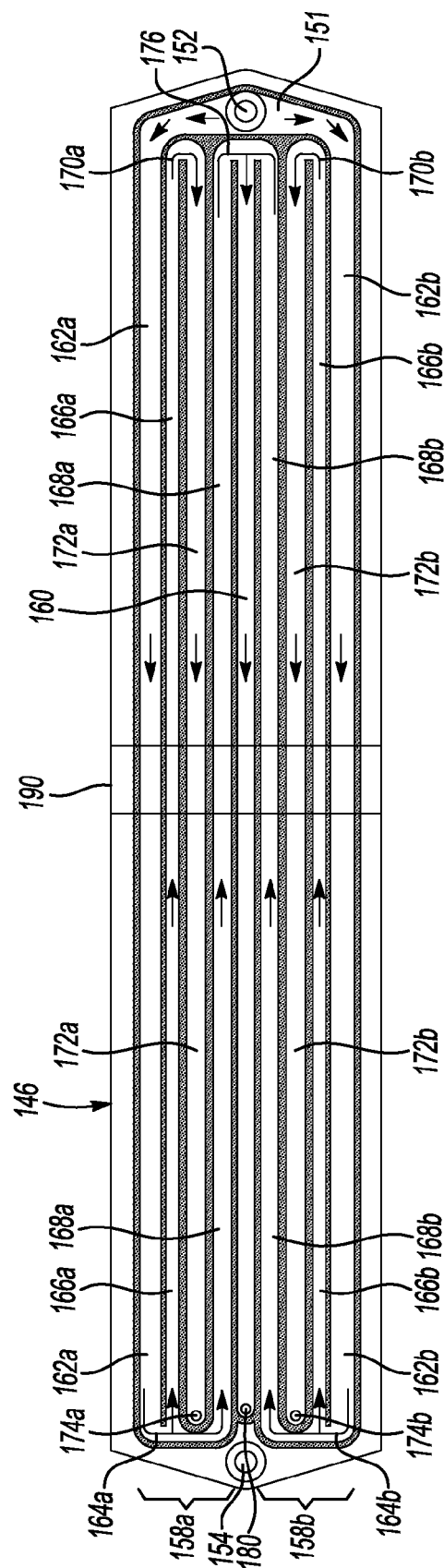

TRACTION BATTERY THERMAL PLATE WITH LONGITUDINAL CHANNEL CONFIGURATION

TECHNICAL FIELD

This disclosure relates to thermal management systems for high voltage batteries utilized in vehicles.

BACKGROUND

Vehicles such as battery-electric vehicles (BEVs), plug-in hybrid-electric vehicles (PHEVs) or full hybrid-electric vehicles (FHEVs) contain a traction battery, such as a high voltage ("HV") battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in regulating temperature of the HV battery components, systems, and individual battery cells.

SUMMARY

A vehicle includes a battery cell array and a thermal plate configured to support the battery cell array. The thermal plate defines an inlet port, two outer channels each having a channel inlet in communication with the inlet port, at least three inner channels disposed between the outer channels, and an outlet port. The ports and channels are arranged such that fluid traveling through any two adjacent channels flows in opposite directions and such that fluid, when exiting the thermal plate, empties from one or more of the inner channels into the outlet port without first entering the channel inlets. The channels may be further arranged such that any two adjacent channels share a common wall having a thickness less than a width of the channels. The thermal plate may further be configured such that heat from the array travels from a top portion of the thermal plate, through the walls, and to a bottom portion of the thermal plate. The top portion of the thermal plate may be brazed to a top portion of the walls. The battery cell array may include one or more battery cells each having a face defining a plane oriented substantially perpendicular to a direction of fluid flow through any one of the at least three channels. The ports and channels may be further arranged such that fluid flows through a central channel of the at least three channels in a same direction as fluid flows through the two outer channels. At least some of the surfaces of the thermal plate defining the channels may include flow features configured to increase an effective surface area of the at least some of the surfaces. The flow features may include dimples, pedestals, or metal foam.

A battery assembly includes a plurality of cells each defining a face and a thermal plate proximate to the cells. The thermal plate defines an inlet, perimeter channels, and interior channels disposed between the perimeter channels. The inlet and channels are arranged such that directions of fluid flow therein are normal to the faces, opposite between adjacent channels, and such that fluid from the inlet empties into the perimeter channels without first entering the interior channels. The thermal plate may further include walls at least partially defining the channels. Each of the walls may be configured to promote heat transfer between fluid in contact therewith and a bottom portion of the thermal plate. The channels may be further arranged such that the direction of fluid flow in a central channel of the interior channels is the same as the direction of fluid flow in the perimeter channels. The thermal plate may further define an outlet disposed on an end of the thermal plate opposite the inlet. At least some surfaces of the thermal plate defining the channels may include flow features configured to increase an effective area of the at least some surfaces. The flow features may include dimples, pedestals, or metal foam.

A battery thermal plate arrangement includes a housing configured to support a battery cell array. The housing defines an inlet port, a set of outlet ports, and a first channel configuration. The first channel configuration includes a perimeter channel configured to receive fluid from the inlet port, a set of return channels configured to receive fluid from the perimeter channel, and a set of exit channels each configured to receive fluid from one of the return channels and route the fluid to one of the outlet ports. One of the exit channels is disposed between the return channels and a fluid flow in the perimeter and exit channels travels in a same direction. The arrangement may further include an exit plenum exterior to the housing and configured to receive fluid from the outlet ports. Each battery cell of the battery cell array may have a width and a length greater than the width. Each of the channels may be arranged to direct fluid flow across the width of the battery cells. Each of the channels may be arranged to direct fluid flow under each of the battery cells of the battery cell array. Each battery cell of the battery cell array may have a bottom face defining a plane, and fluid flow in the channels may be substantially perpendicular to the plane.

BRIEF DESCRIPTION OF THE DRAWINGS

FIG. 5 is a plan view of a channel configuration for a bottom plate of the thermal plate from FIG. 4.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
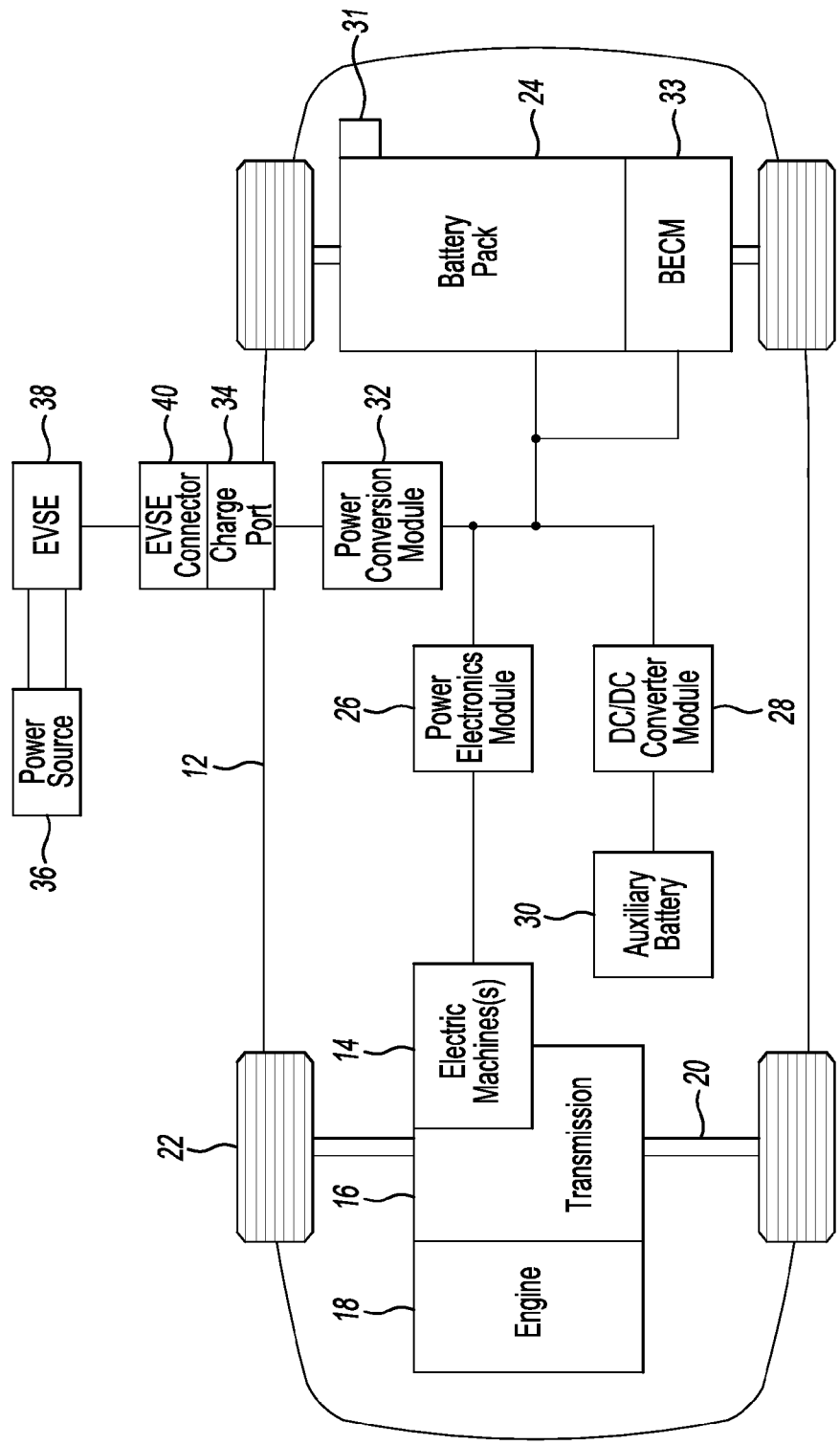
FIG. 1 is a schematic illustration of a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode under certain conditions.

A traction battery or battery pack 24 stores energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be, for example, an electric vehicle such as a plug-in hybrid vehicle, or a battery-electric vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another. The DC/DC converter module 28 and BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cell array 88 during vehicle operations. Uniform thermal fluid distribution and high heat transfer capability are two thermal plate 90 considerations for providing effective thermal management of the battery cell arrays 88 and other surrounding components. Since heat transfers between thermal plate 90 and thermal fluid via conduction and convection, the surface area in a thermal fluid flow field is important for effective heat transfer, both for removing heat and for preheating the battery cells 92 at cold temperatures. For example, charging and discharging the battery cells generates heat which may negatively impact performance and life of the battery cell array 88 if not removed. Alternatively, the thermal plate 90 may also provide heat to preheat the battery cell array 88 when subjected to cold temperatures.

Figure 2:
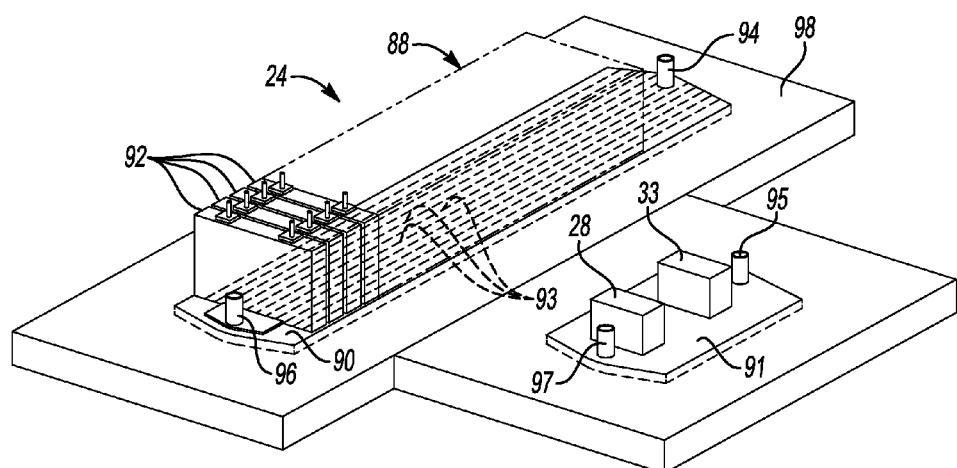
FIG. 2 is a perspective view of a portion of a thermal management system for the traction battery of the vehicle in FIG. 1.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, thermal plate 91, battery cell arrays 88, and other components. The battery tray 98 may include one or more recesses to receive thermal plates.

Different battery pack configurations may be available to address individual vehicle variables including packaging constraints and power requirements. The battery cell arrays 88 may be contained within a cover or housing (not shown) to protect and enclose the battery cell arrays 88 and other surrounding components, such as the DC/DC converter module 28 and the BECM 33. The battery cell arrays 88 may be positioned at several different locations including below a front seat, below a rear seat, or behind the rear seat of the vehicle, for example. However, it is contemplated the battery cell arrays 88 may be positioned at any suitable location in the vehicle 12.

Two examples of desired thermal plate deliverables may include (i) extracting a maximum amount of heat from the battery cells and (ii) maintaining a substantially uniform temperature at a base of the battery cells. To achieve these deliverables, a thermal management system may take several considerations into account. For example, a temperature of the battery cell may vary across the cell between a minimum and a maximum temperature which may be referred to as a battery cell delta temperature ("cell $\Delta T$"). In a battery cell array, the temperatures of the battery cells may vary across the battery cell array between a minimum and maximum temperature which may be referred to as a battery cell array delta temperature ("array $\Delta T$"). Lower cell $\Delta T$ and array $\Delta T$ measurements typically indicate a more uniform temperature distribution throughout the battery cell and battery cell array, respectively. As such, maximizing overall heat transfer efficiency between the battery cell array and thermal plate may assist in minimizing cell $\Delta T$ and array $\Delta T$. A desired cell $\Delta T$ and a desired array $\Delta T$ may vary according to power requirements for different vehicles and thermal management systems.

Figures 3A, 3B, 3C:
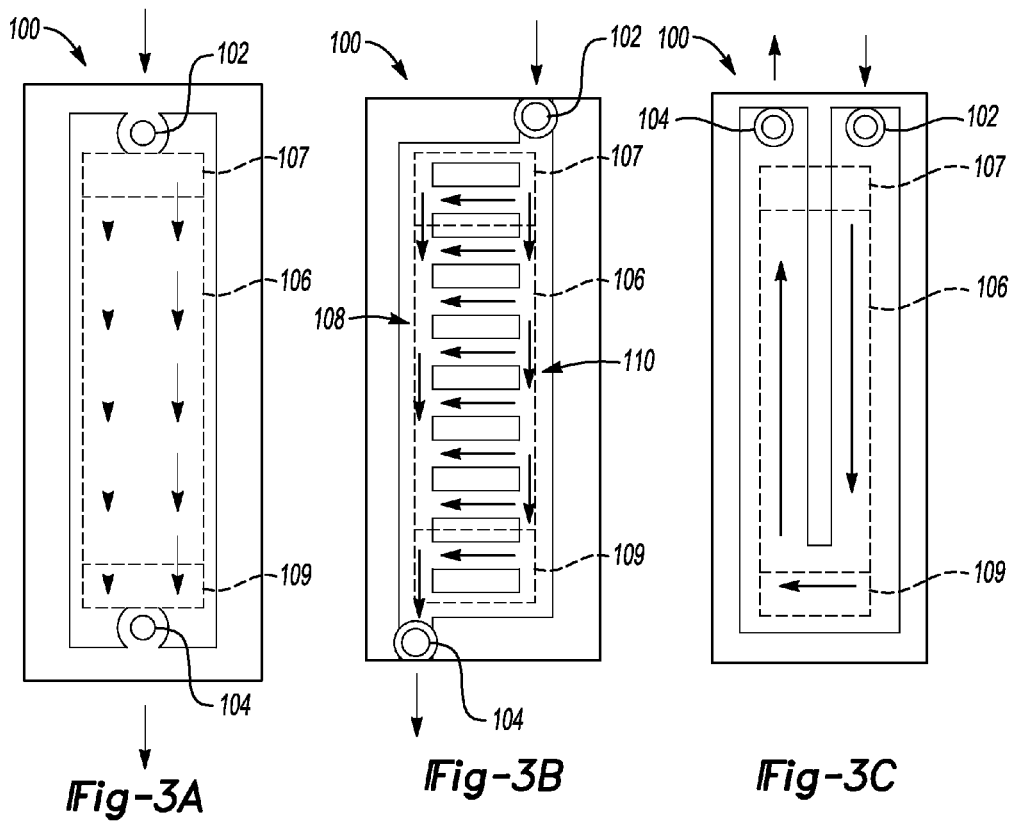
FIG. 3A is an illustrative plan view of a thermal plate configured for serial flow of thermal fluid.
FIG. 3B is an illustrative plan view of a thermal plate configured for parallel flow of thermal fluid.
FIG. 3C is an illustrative plan view of a thermal plate configured for U-flow of thermal fluid.

Thermal plates may use varying types of liquid flow patterns to assist in extracting heat from the battery cells and battery cell arrays, and thus obtain desired cell $\Delta T$ and array $\Delta T$ performance. Thermal plate 100 in FIGS. 3A through 3C is shown in three configurations to illustrate examples of liquid serial flow, parallel flow, and U-flow, respectively. Thermal fluid, such as coolant, refrigerant, or water, may enter the thermal plate 100 via inlet port 102, travel across the thermal plate 100 as indicated by the directional reference arrows, and then exit the thermal plate 100 via outlet port 104. A footprint of a battery cell array 106 is shown with a dashed line. The battery cell array 106 may include battery cells such as a battery cell 107 and a battery cell 109, the footprints of which are also both shown with dashed lines. With each type of liquid flow example, thermal fluid traveling through the thermal plate 100 may absorb heat generated from the battery cells of the battery cell array 106.

In serial flow as shown in FIG. 3A, thermal fluid enters thermal plate 100 via inlet port 102 and may travel across the serial flow field in a substantially uniform fashion. The battery cell 109 is the last battery cell of the battery cell array 106 and nearest the outlet port 104. In this example, the battery cell 109 will operate at a higher temperature than the battery cell 107 nearer to the inlet port 102 since the thermal fluid flowing underneath the battery cell 109 will have absorbed heat from the battery cell array 106 while traveling across the thermal plate 100. The difference in operating temperatures for the battery cell 107 and battery cell 109 will drive a high array $\Delta T$ of battery cell array 106 in this example which may negatively affect vehicle performance.

In parallel flow as shown in FIG. 3B, thermal fluid enters the thermal plate 100 via the inlet port 102 and travels along an entry channel 110 prior to distribution in a horizontal direction below the battery cell array 106. The thermal fluid will be at its coolest temperature while in the entry channel 110. A portion of the battery cells 107 and 109 within the battery cell array 106 nearer to an exit channel 108 will see warmer thermal fluid than the portions of battery cells 107 and 109 which are nearer to the entry channel 110. This may result in a higher cell ΔT which may negatively affect the performance of the battery cell array 106 and the life of the battery cells therein.

In U-flow as shown in FIG. 3C, the battery cell 109, furthest from the inlet port 102 and outlet port 104, may see average temperature (relative to the rest of the battery cells within the battery cell array 106) while the battery cell 107, nearest the inlet port 102 and outlet port 104, may see the warmest fluid on one half of the battery cell and the coolest fluid on the other half, which may tend to average one another out. Therefore, the measured array ΔT is lower than parallel flow and serial flow and the U-flow system may consequently improve vehicle performance. However, in this example of U-flow the first few battery cells nearest the inlet port 102 and outlet port 104 may see a difference in temperature between their respective two halves which may result in a high cell ΔT. This may negatively affect the performance of the battery cell array 106 and the life of the battery cells therein.

Figure 4:
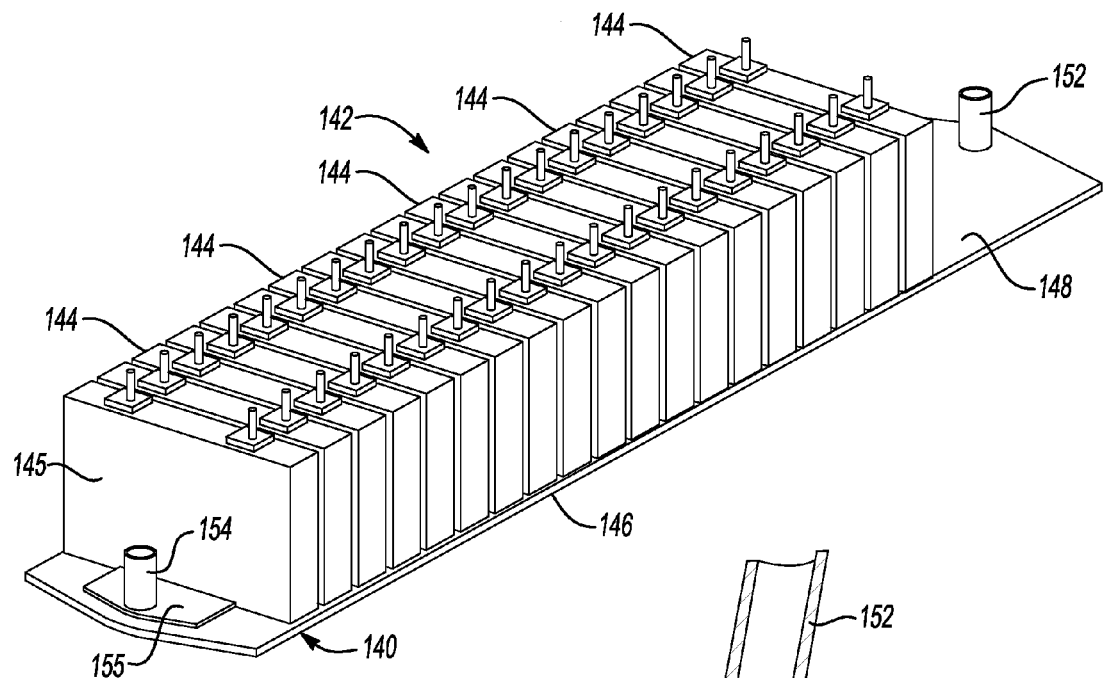
FIG. 4 is a perspective view of a portion of a traction battery assembly including a thermal plate supporting a battery cell array.

Now referring to FIG. 4, a portion of a traction battery assembly is shown which may include a thermal plate 140 configured to support a battery cell array 142 including battery cells 144. Other structural elements (not shown) may be used to support the battery cell array 142 within the vehicle as well. The thermal plate 140 may also be configured for thermal communication with the battery cell array 142. Examples of thermal communication include conduction and convection. A bottom portion of the battery cells 144 or a bottom face of the battery cells 144 may directly contact the thermal plate 140 such that thermal plate 140 supports the battery cells 144. As described above, a sheet of thermal interface material (not shown) may be positioned between the thermal plate 140 and the battery cells 144. The thermal interface material may enhance heat transfer between the battery cells 144 and the thermal plate 140. The thermal interface material may also provide electrical insulation between the battery cells 144 and the thermal plate 140. Each battery cell 144 may also define a face 145. In this example, the face 145 has the largest area in comparison to faces on the upper, side, and bottom portions of the battery cell 144. The thermal plate 140 may include a bottom plate 146 and an upper plate 148. The upper plate 148 may be fixed to the bottom plate 146. While multiple methods of securing the upper plate 148 to the bottom plate 146 are available, one example for Aluminum plates includes brazing. Another example includes fastening methods using, for example, seals, nuts, and bolts. An inlet port 152 may be positioned at one end of the thermal plate 140 and an outlet port 154 may be positioned at the other end. Now additionally referring to FIG. 5, the bottom plate 146 may define channels having a longitudinal orientation relative to the thermal plate 140, and a perpendicular orientation relative to a plane defined by the faces 145 of the battery cells 144. This perpendicular orientation may provide for thermal fluid flow within the channels to be normal to the faces 145 of the battery cells 144. Walls may at least partially define the channels and may be configured to promote heat transfer between fluid in contact therewith and the bottom plate 146. An inlet plenum 151 may be arranged between the inlet port 152 and the channels. The inlet plenum 151 may be defined by the bottom plate 146. Now additionally referring to FIG. 7, an exit plenum 155 may be arranged between the channels and outlet port 154. The inlet port 152 and outlet port 154 may be in fluid communication with the channels as further described below. Optionally, the thermal plate 140 may define the inlet port 152 and outlet port 154.

Figure 6:
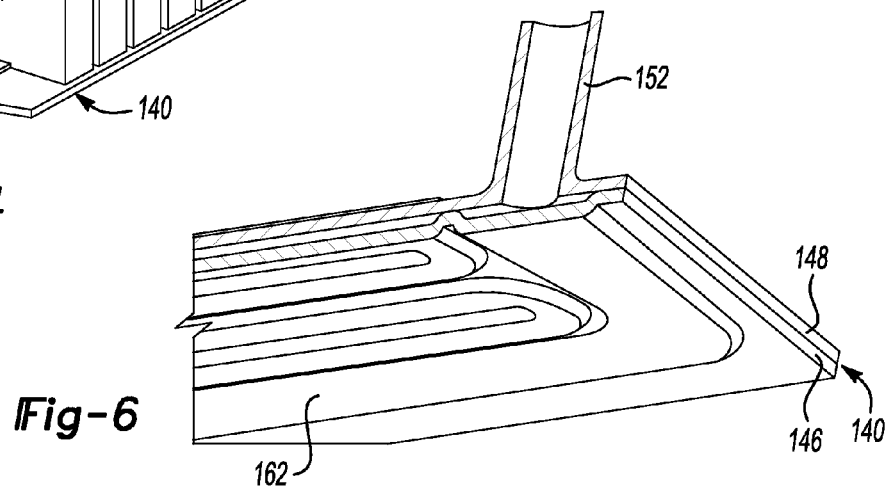
FIG. 6 is a perspective view, in cross-section, of an inlet port in communication with a channel configuration of the thermal plate from FIG. 4.

FIG. 5 shows the bottom plate 146 separated from the upper plate 148. The bottom plate 146 may define a first channel configuration 158a and a second channel configuration 158b which may share a central exit channel 160 therebetween. Each of the channel configurations 158a and 158b may include adjacent channels to guide fluid flow within the thermal plate 140. For example, the first channel configuration 158a may include an outer channel 162a in communication with the inlet port 152 as also shown in FIG. 6. The outer channel 162a may be configured to deliver fluid in a first direction to a router 164a. The router 164a may divert the fluid to a first set of return channels 166a and 168a. The fluid traveling along the return channel 166a and the return channel 168a may flow in a second direction opposite the first direction. A router 170a may redirect fluid from the return channel 166a to flow in the first direction along an exit channel 172a en route to an outer exit port 174a. A central router 176 may redirect fluid from the return channel 168a to flow in the first direction along the central exit channel 160 en route to a central exit port 180. A width of the central exit channel 160 may be optimized to ensure even fluid distribution and flow across all return channels 166a, 166b, 168a, and 168b which may optimize the corresponding cell ΔT distribution. Without even fluid distribution and flow, the battery cells 144 may see a higher cell ΔT.

The second channel configuration 158b may include an outer channel 162b in communication with the inlet port 152. The outer channel 162b may be configured to deliver fluid in the first direction to a router 164b. The router 164b may deliver the fluid to a second set of return channels 166b and 168b. The fluid traveling along the return channel 166b and the return channel 168b may flow in the second direction. A router 170b may redirect fluid from the return channel 166b to flow in the first direction along an exit channel 172b en route to an outer exit port 174b. The central router 176 may redirect fluid from the return channel 168b to flow in the first direction along the central exit channel 160 en route to the central exit port 180. While the bottom plate 146 may define the channels of the thermal plate 140 as described above, it is also contemplated that the upper plate 148 may optionally define the channels as well.

Figure 7:
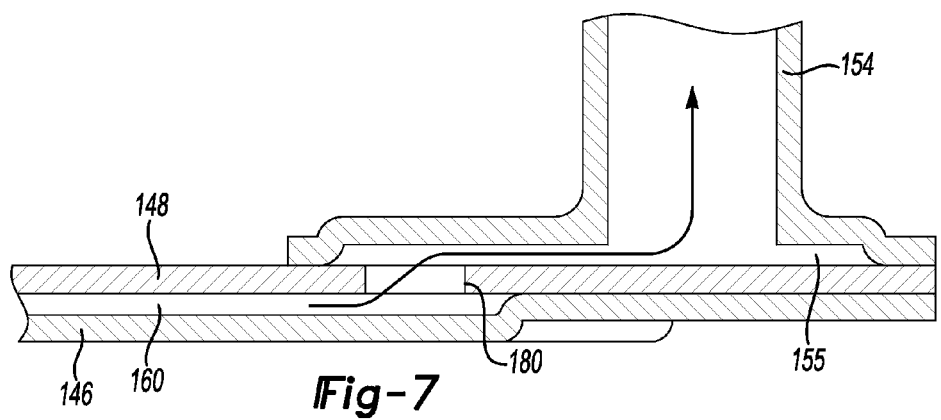
FIG. 7 is a side view, in cross-section, of an outlet port and exit plenum in communication with a channel configuration of the thermal plate from FIG. 4.

The exit plenum 155 may receive fluid traveling through the outer exit port 174a, outer exit port 174b, and central exit port 180 and then direct the fluid to the outlet port 154. For example, FIG. 7 shows a flow path for fluid traveling along the central exit channel 160, through the central exit port 180, in to the exit plenum 155, and then into the outlet port 154. In this example, the exit plenum 155 is positioned above the thermal plate 140. However, in other examples where packaging constraints may prevent positioning above the thermal plate 140, the exit plenum 155 may be positioned below the thermal plate 140.

As described above and shown in FIG. 5, the channels of the channel configurations 158a and 158b may be arranged to alternate fluid flow in adjacent channels between opposite directions such as the first and second directions. This arrangement may provide improved vehicle performance and assist in prolonging the life of the battery cells 144 when compared with a serial flow or a parallel flow arrangement as shown in FIGS. 3A and 3B, respectively. For example, thermal fluid entering the outer channels 162a and 162b may be referred to as "cold" fluid since the fluid is fresh from the inlet port 152. Fluid flowing through the return channels 166a and 166b and the return channels 168a and 168b may be considered "warm" fluid, since heat may be absorbed while flowing through the outer channels 162a and 162b.

For example, the outer channels 162a and 162b may be positioned proximate to a respective side rail (not shown) containing the battery cell array 142 to assist in removing heat from outer portions of the battery cell array 142 where thermal fluid may not flow directly beneath. These outer portions of the battery cell array 142 may be located near an edge of the thermal plate 140 plate.

Continuing to refer to FIGS. 5 through 7, fluid flowing through the exit channel 172a, exit channel 172b, and central exit channel 160 may be referred to as "hot" fluid having a temperature higher than the cold fluids due to additional heat absorbed from the battery cell array 142 as the thermal fluid travels through the channels. In this example, channels with hot fluid are not directly adjacent to one another and instead are separated by channels with cold fluid or warm fluid. This arrangement may assist in reducing cell ΔT and array ΔT since each battery cell 144 throughout the battery cell array 142 may receive the benefit of thermal fluid flowing at varied temperatures therebelow and within the channels. For example, a battery cell footprint 190 as shown in FIG. 5 illustrates how the corresponding battery cell 144 may be exposed to thermal fluid in each of the outer channels 162a and 162b, return channels 166a and 166b, return channels 168a and 168b, exit channels 172a and 172b, and central exit channel 160.

Additional features to enhance heat transfer may include increasing a surface area within the channels. For example, the channels may include brazed split fins, brazed Aluminum foam, or extrusions in the bottom plate 146 or the top plate 148. These features may also assist in transferring more heat to the bottom plate 146 or the top plate 148. In additional to providing additional surface area to assist with heat transfer, the additional measures may also adjust a velocity of thermal fluid flow.

Figure 8:
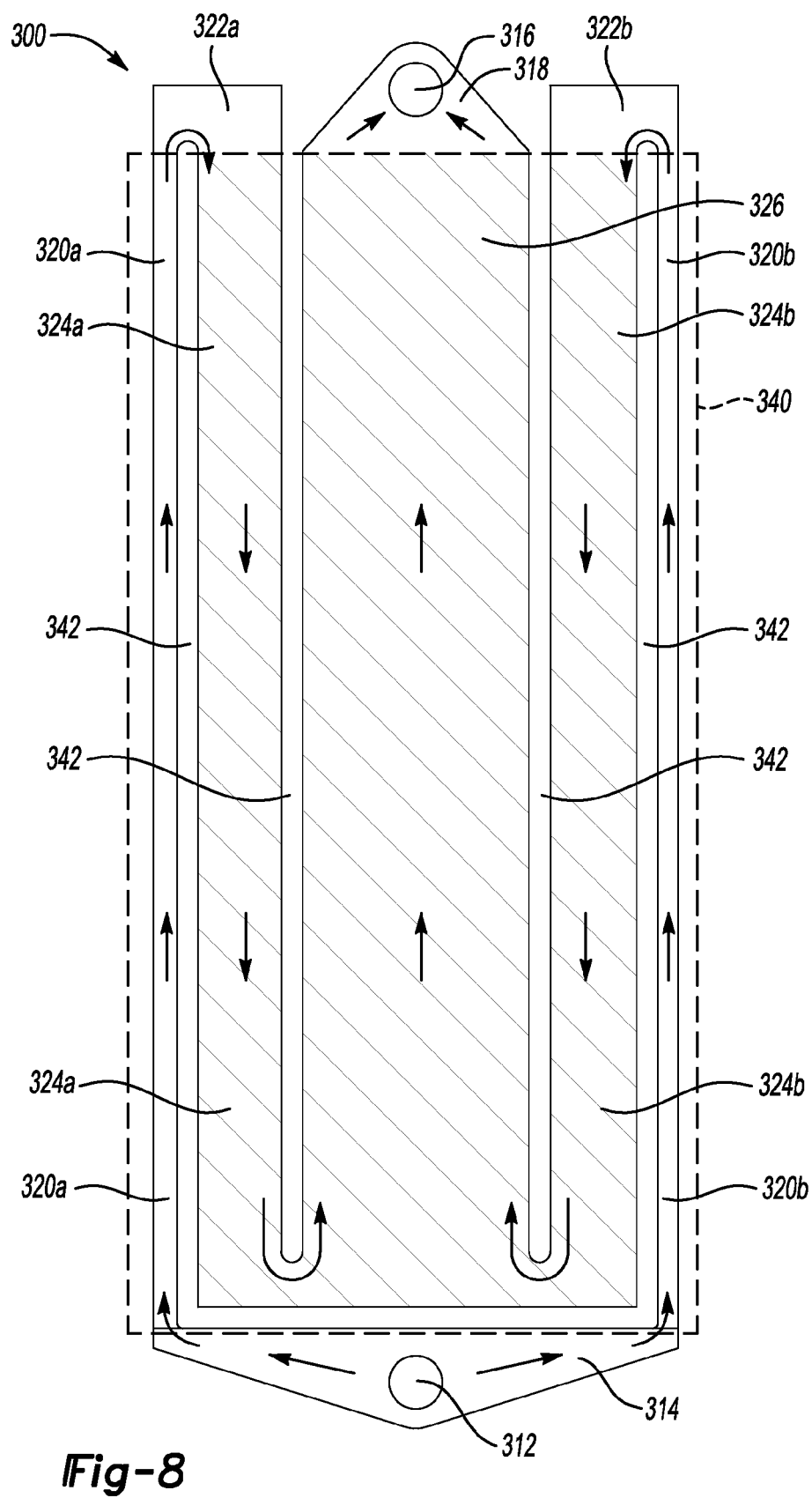
FIG. 8 is a plan view of a channel configuration for a thermal plate.

As disclosed herein, a longitudinal channel configuration within a thermal plate may include various numbers of channels. An example of a five channel thermal plate configuration is shown in FIG. 8. A footprint of a battery cell array 340 is shown with a dashed line. A bottom plate 300 may define longitudinal channels having a perpendicular orientation relative to faces of battery cells included in a battery cell array (not shown) supported by the bottom plate 300 and an upper plate (not shown). The upper plate may be fixed to the bottom plate 300 similar to the other thermal plate assemblies described herein. The bottom plate 300 may define an inlet port 312 which may be in communication with an inlet plenum 314. An outlet port 316 may be in communication with an exit plenum 318. The bottom plate 300 may define the inlet port 312, inlet plenum 314, outlet port 316, and exit plenum 318.

The channels may include two outer channels 320a and 320b which may be in communication with the inlet plenum 314. The outer channels 320a and 320b may optionally be modified and/or turbulized to provide increased surface area which may also increase heat transfer efficiency. Turbulization involves the modification of a surface involved in a heat transfer process to intensify the heat transfer capabilities. Providing bumps and/or extrusions to a thermal flow field may be one example of turbulizing the thermal flow field surface. Thermal fluid flow within the outer channels 320a and 320b may travel in a first direction. The outer channels 320a and 320b may also have a smaller width than other channels within the channel configuration to achieve a higher velocity of thermal fluid flow which may increase the amount of heat absorbed from the portions of the battery cell array 340 extending past the outer channels 320a and 320b en route to a return plenum 322a and 322b. The return plenums 322a and 322b, sometimes referred to as routers, may receive fluid traveling through the outer channels 320a and 320b and direct the fluid to flow in a second direction along the return channels 324a and 324b, respectively. The return channels 324a and 324b and the central exit channel 326 may also optionally be turbulized. Thermal fluid may then travel along a central exit channel 326 in the first direction en route to the exit plenum 318 and the outlet port 316. The bottom plate 300 may also define the inlet port 312 and the outlet port 316. Optionally, the upper plate 148 may define the channels.

In this example of a five channel thermal plate configuration, the channels may be arranged to alternate fluid flow in adjacent channels between opposite directions such as the first and second directions. The lower cell ΔT and array ΔT achieved with this arrangement may provide improved vehicle performance and assist in prolonging the life of the battery cells 144 when compared with the serial flow arrangement as shown in FIG. 3A.

For example, thermal fluid entering the outer channels 320a and 320b may be referred to as "cold" fluid since the fluid is fresh from the inlet port 312 and inlet plenum 314. Fluid flowing through the return channels 324a and 324b may be considered "warm" fluid since heat may be absorbed while flowing through the outer channels 320a and 320b. For example, the outer channels 320a and 320b may be positioned proximate to a respective side rail (not shown) containing the cell array 340 to assist in removing heat from outer portions of the battery cell array 340 where thermal fluid may not flow directly beneath. These outer portions of the battery cell array 340 may be located near an edge of the thermal plate 140 and may also be subjected to clamping loads during assembly.

Thermal fluid flowing through the central exit channel 326 may be referred to as "hot" fluid having a temperature higher than the cold fluids due to additional heat absorbed from the battery cell array as the thermal fluid travels through the return channels 324a and 324b. In this example, the central exit channel 326 with hot fluid is arranged between the outer channels 320a and 320b and the return channels 324a and 324b, which may assist in reducing array ΔT since each battery cell throughout the battery cell array receives the benefit of thermal fluid at varied temperatures within the channels. For example, the battery cell footprint 340 as shown in FIG. 8 illustrates how the corresponding battery cell may receive the heat transfer benefit of thermal fluid in the outer channels 320a and 320b, the return channels 324a and 324b, and the central exit channel 326.

As described above, additional features to enhance heat transfer may include modifying a surface area within the channels. At least some of the surfaces of the channels may include flow features configured to increase an effective surface area of the channels. For example, the flow features may include brazed split fins, brazed metal foam such as Aluminum, extrusions, dimples, or pedestals in the bottom plate. These features may also assist in transferring more heat to the bottom plate 300. In addition to providing additional surface area to assist with heat transfer, these measures may also adjust a velocity of thermal fluid flow.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a battery cell array; and
a thermal plate configured to support the array, and defining an inlet port, two outer channels each having a channel inlet in communication with the inlet port, at least three inner channels disposed between the outer channels, and an outlet port, the ports and channels being arranged such that fluid flow splits from the inlet port to the two outer channels and fluid traveling through any two adjacent channels flows in opposite directions and fluid, when exiting the thermal plate, empties from one or more of the inner channels into the outlet port without first entering the channel inlets.

2. The vehicle of claim 1, wherein the channels are further arranged such that any two adjacent channels share a common wall having a thickness less than a width of the channels.

3. The vehicle of claim 2, wherein the thermal plate is further configured such that heat from the array travels from a top portion of the thermal plate, through the walls, to a bottom portion of the thermal plate.

4. The vehicle of claim 2, wherein a top portion of the thermal plate is brazed to a top portion of the walls.

5. The vehicle of claim 1, wherein the battery cell array includes one or more battery cells each having a face defining a plane oriented substantially perpendicular to a direction of fluid flow through any one of the at least three channels.

6. The vehicle of claim 1, wherein the ports and channels are further arranged such that fluid flows through a central channel of the at least three channels in a same direction as fluid flows through the two outer channels.

7. The vehicle of claim 1, wherein at least some of the surfaces of the thermal plate defining the channels include flow features configured to increase an effective area of the at least some of the surfaces.

8. The vehicle of claim 7, wherein the flow features include dimples, pedestals, or metal foam.

9. A battery assembly comprising:
a plurality of cells each defining a face; and
a thermal plate proximate to the cells and defining an inlet, perimeter channels, and interior channels disposed between the perimeter channels, wherein the inlet and channels are arranged such that directions of fluid flow therein are normal to the faces and opposite for adjacent channels, and fluid from the inlet splits into two directions and empties into the perimeter channels.

10. The assembly of claim 9, wherein the thermal plate further includes walls at least partially defining the channels and wherein each of the walls is configured to promote heat transfer between fluid in contact therewith and a bottom portion of the thermal plate.

11. The assembly of claim 9, wherein the channels are further arranged such that the direction of fluid flow in a central channel of the interior channels is the same as the direction of fluid flow in the perimeter channels.

12. The assembly of claim 9, wherein the thermal plate further defines an outlet disposed on an end of the thermal plate opposite the inlet.

13. The assembly of claim 9, wherein at least some surfaces of the thermal plate defining the channels include flow features configured to increase an effective area of the at least some surfaces.

14. The assembly of claim 13, wherein the flow features include dimples, pedestals, or metal foam.

15. A battery thermal plate arrangement comprising:
a housing configured to support a battery cell array, and defining an inlet port, a set of outlet ports, and a first channel configuration and a second channel configuration, each configuration including
a perimeter channel configured to receive fluid from the inlet port,
a set of return channels configured to receive fluid from the perimeter channel, and
a set of exit channels each configured to receive fluid from one of the return channels and route the fluid to one of the outlet ports, wherein one of the exit channels is disposed between the return channels and wherein a fluid flow in the perimeter and exit channels is in a same direction.

16. The arrangement of claim 15, further comprising an exit plenum exterior to the housing and configured to receive fluid from the outlet ports.

17. The arrangement of claim 15, wherein each battery cell of the battery cell array has a width and a length greater than the width and wherein each of the channels is arranged to direct fluid flow across the width of the battery cells.

18. The arrangement of claim 15, wherein each of the channels is arranged to direct fluid flow under every one of the battery cells of the battery cell array.

19. The arrangement of claim 15, wherein the battery cell array includes one or more battery cells each having a face defining a plane oriented substantially perpendicular to a direction of fluid flow through the channels.

* * * * *